Nov. 8, 1932.  K. KELLEY ET AL  1,886,886
METHOD OF AND APPARATUS FOR THE RECOVERY OF MATTER FROM WELLS
Filed Jan. 23, 1931
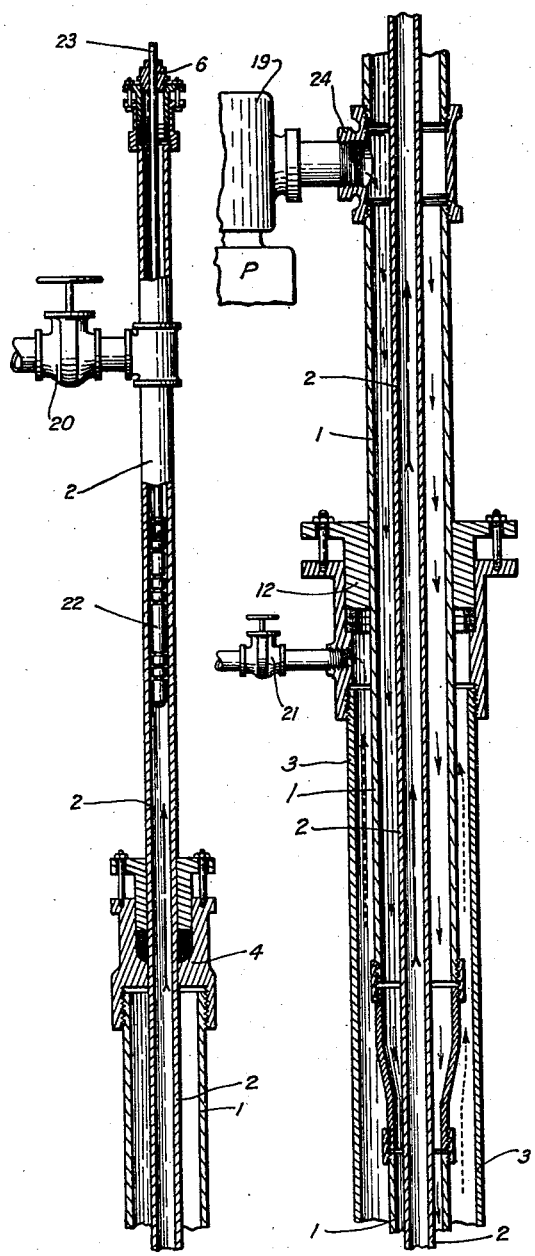
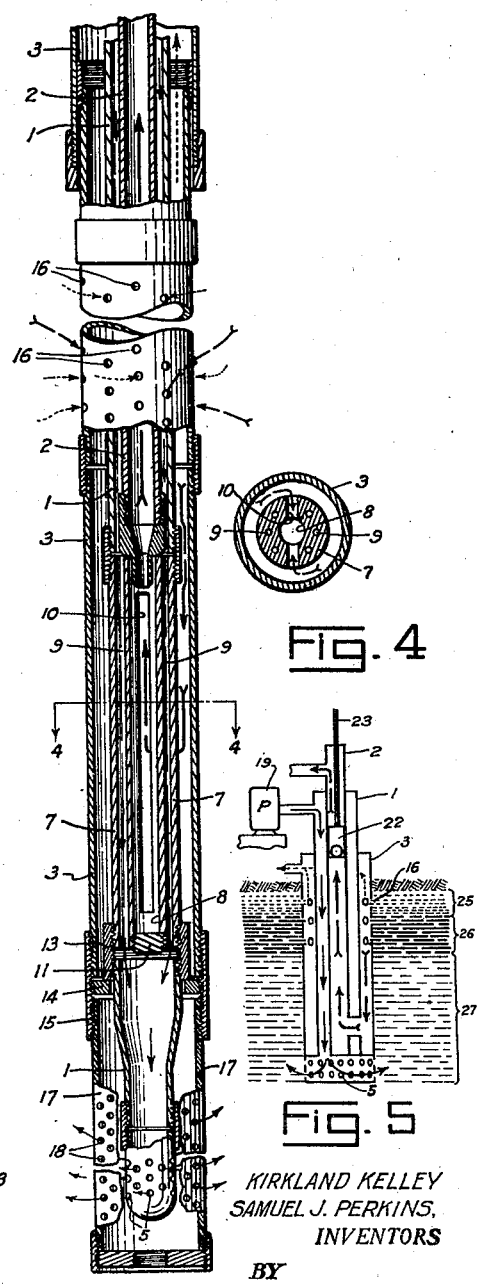
KIRKLAND KELLEY
SAMUEL J. PERKINS,
INVENTORS
BY
ATTORNEY.

Patented Nov. 8, 1932

1,886,886

UNITED STATES PATENT OFFICE

KIRKLAND KELLEY, OF HOUSTON, TEXAS, AND SAMUEL J. PERKINS, OF SULPHUR, LOUISIANA

METHOD OF AND APPARATUS FOR THE RECOVERY OF MATTER FROM WELLS

Application filed January 23, 1931. Serial No. 510,613.

This invention relates to methods of and apparatuses for the recovery of matter from wells.

It has for its principal specific object the provision of a new and improved method and apparatus for use in the recovery of heavy and practically solid oils that will not flow naturally from wells.

Other objects will hereinafter appear.

In the drawing, which is illustrative of the preferred embodiment of the invention, Figs. 1, 2 and 3 are fragmentary and partly sectional side elevations of the upper, intermediate and lower portions thereof, respectively; Fig. 4, a horizontal section on the line 4—4 of Fig. 3; and Fig. 5, a diagrammatic view illustrating the movement of a heating fluid and the gas and oil recovered.

The apparatus shown includes a fluid entrance pipe 1, a liquid exit pipe 2, and a gas exit pipe 3.

The fluid entrance pipe 1 is closed and sealed at its upper end on the liquid exit pipe by any suitable means such as that shown at 4. At the lower end of the fluid entrance pipe 1 are outlet openings 5.

The liquid exit pipe 2 is closed and sealed at its upper end by packing 6 through which the rod of a plunger hereinafter referred to reciprocates.

The lower ends of fluid entrance pipe 1 and liquid exit pipe 2 are connected to a by-passing device which has a central longitudinal bore 8 constituting an extension of liquid exit pipe 2; longitudinal ducts 9 constituting an extension of fluid extrance pipe 1; and longitudinal slots 10 constituting inlet openings for the liquid exit pipe 2. In the lower end of this device is a plug 11 whereby the lower end of fluid exit pipe 2 is sealed so that fluid cannot move upwardly thereinto from the lower extremity of fluid entrance pipe 1.

The upper end of gas exit pipe 3 is closed and sealed on fluid entrance pipe 1 by any suitable means such as that shown at 12. The lower end of this gas exit pipe 3 is also closed, as the collar 13 on by-pass device 7 rests upon a ring 14 which is threaded in the coupling 15. In the side of the gas exit pipe 3 are a plurality of inlet openings 16 which are at some distance above the outlet openings 5 of fluid entrance pipe 1.

To protect the lower end of fluid entrance pipe 1, a cylindrical shoe 17, perforated as indicated at 18, may be connected by coupling 15 to gas exit pipe 3.

A pump to force fluid downwardly through the fluid entrance pipe 1 is indicated at 19; and valves to control the flow of fluid out of liquid exit pipe 2 and gas exit pipe 3 are indicated at 20 and 21, respectively. A plunger 22 is disposed within the upper portion of liquid exit pipe 2 and may be reciprocated by the rod 23 to draw liquid out of said pipe.

The method of recovering gas and oils that are normally heavy and practically solid will now be described:

The apparatus is lowered into the well until the outlet openings 5 of the fluid entrance pipe 1 are at the base of the oil bearing sands. The upper portion of the gas exit pipe 3, and that part of the apparatus thereabove, will then be above the surface of the earth.

To seal the space between the gas exit pipe 3 and the wall of the well, the gas exit pipe 3 may be cemented in the well at a point immediately above its inlet openings 16. After this is done, no fluid can pass about said pipe downwardly toward or upwardly from said inlet openings. Most formations, however, will move inwardly to snugly engage the pipe 3 and practically seal it in the well, so that it will seldom be necessary to cement it in the well.

The valves 20 and 21 having been closed to prevent escape of oil or gas from liquid exit pipe 2 and gas exit pipe 3, superheated water, which may be weighted with sodium hydroxide, soda ash, mud or the like, is then drawn by the pump 19 from any source, not shown, and forced into the fluid entrance pipe inlet 24. The water will pass downwardly in the annular space between the fluid inlet pipe 1 and the liquid exit pipe 2, through ducts 9 and finally out of outlet 5 and through the perforations 18 of shoe 17. The fluid will move laterally and upwardly into the formation, and into contact with the solid oil.

The amount and temperature of the fluid required to penetrate the formation and melt the oil will, of course, depend upon the composition of the formation encountered. After a sufficient quantity of heating fluid has been pumped into the well to melt and lighten the oil, the oil will move upwardly until the gas, oil, and water surrounding the apparatus move substantially into the relative positions indicated by Fig. 5, in which the gas is shown at 25, the melted oil at 26, and the water at 27. The pump may then be stopped.

If the necessary temperature and quantity of the water are accurately predetermined, and if there is sufficient pressure in the well, when the valves 20 and 21 are opened oil and gas will flow into the gas exit pipe 3 through the perforations 16. The gas will move upwardly in the annular space between the gas exit pipe 3 and the fluid entrance pipe 1 and outwardly through the valve 21. The oil will flow downwardly between the gas exit pipe 3 and fluid entrance pipe 1, through slots 10 upwardly in bore 8, upwardly through fluid exit pipe 2 and finally out through valve 20.

The unbroken arrows in the drawing indicate the flow of the water; the broken arrows, the flow of the melted oil; and the dotted arrows, the flow of the gas.

If gas issues from gas exit pipe 3, but no oil rises in liquid exit pipe 2, the plunger 22 may be reciprocated by the rod 23 to draw the oil upwardly through liquid exit pipe 2.

By manipulating valves 20 and 21, the operator can ascertain and change to some extent the relative quantities of gas, oil and water, and the pressure thereon below. For example, if gas moves upwardly in both gas exit pipe 3 and liquid exit pipe 2, this will indicate that there is so much confined gas in the well that the melted oil cannot move upwardly about the pipe 3 to the inlet openings 16. Valve 20 may then be closed and valve 21 kept open until enough gas has escaped to permit the melted oil to move upwardly until it reaches the inlet openings 16, when the valve 20 may be opened to permit the oil to flow upwardly and out of liquid exit pipe 2. If water comes upwardly through liquid exit pipe 2 or gas exit pipe 3, this may be due to incomplete melting of the oil, and both valves 20 and 21 should then be closed to give the water more time within which to melt the oil.

Various other uses of the valves 20 and 21 will be apparent to those skilled in the art.

As the water is passed through, but not in contact with the gas and oil, and is forced into contact only with the lower portion of the oil, and as the oil and gas are carefully skimmed off, the gas, oil and water are efficiently separated as indicated by Fig. 5, and this separation is never disturbed by additional water pumped into the well.

It is to be understood that any heating fluid other than water may be employed; various changes may be made in the apparatus; and the method and apparatus may be used to recover matter other than gas and heavy, solid oils—all without departing from the scope of the following claims.

We claim:

1. The method of recovering matter from a well, which consists in passing a fluid heavier than said matter substantially through said matter but not in contact therewith, forcing said fluid into contact with the lower portion of said matter, and skimming off said matter while it is in the well.

2. The method of recovering oil from a well, which consists in passing a heating fluid substantially through but not in contact with said oil, forcing said fluid into contact with the lower portion of said oil, and skimming off said oil while it is in the well.

3. The method of recovering from a well gas and oil which consists in passing a heating fluid substantially through said gas and oil but not in contact therewith, forcing said fluid into contact with the lower portion of said oil, skimming off said gas and oil, and conducting said gas and oil separately from the well.

4. The method of recovering from a well oil that is normally substantially solid and heavier than a certain heating fluid, which consists in passing said fluid substantially through said oil but not in contact with said oil, forcing said fluid into contact with the lower portion of said oil until said oil is melted and lighter than said fluid, and skimming off said oil while it is in the well.

5. The method of recovering from a well gas, and oil that is normally substantially solid and heavier than a certain heating fluid, which consists in passing said fluid substantially through said gas and oil but not in contact therewith, forcing said fluid into contact with the lower portion of said oil, until said oil is melted and lighter than said fluid, skimming off said gas and oil, and conducting said gas and oil separately from the well.

6. In a well apparatus, an entrance pipe having an outlet, and an exit pipe within but not in communication with said entrance pipe, said exit pipe having an inlet above said outlet.

7. In a well apparatus, a fluid entrance pipe having an outlet, a gas exit pipe having an inlet above the outlet of said fluid entrance pipe, and a liquid exit pipe having an inlet above the outlet of said fluid entrance pipe.

8. In a well apparatus, a fluid entrance pipe having an outlet, a gas exit pipe having an inlet above the outlet of said fluid entrance pipe, a liquid exit pipe having an inlet above the outlet of said fluid entrance pipe, and means to control the flow of gas and liquid through said exit pipes.

9. In a well apparatus, a gas exit pipe having an inlet, a fluid entrance pipe within said gas exit pipe and having an outlet below the inlet of said gas exit pipe, and a liquid exit pipe within but not in communication with said fluid entrance pipe, said liquid exit pipe having an inlet above the outlet of said fluid entrance pipe, and communicating with the inlet of said gas exit pipe.

10. In a well apparatus, a gas exit pipe having an inlet, a fluid entrance pipe within said gas exit pipe and having an outlet below the inlet of said gas exit pipe, and a liquid exit pipe within but not in communication with said fluid entrance pipe, said liquid exit pipe having an inlet above the outlet of said fluid entrance pipe, and below and in communication with the inlet of said gas exit pipe.

11. In a well apparatus, a gas exit pipe having an inlet, a fluid entrance pipe within said gas exit pipe and having an outlet below the outlet of said gas exit pipe, a liquid exit pipe within but not in communication with said fluid entrance pipe, said liquid exit pipe having an inlet above the outlet of said fluid entrance pipe, and communicating with the inlet of said gas exit pipe, and means to control the flow of gas and liquid through said exit pipes.

12. In a well apparatus, a gas exit pipe having an inlet, a fluid entrance pipe within said gas exit pipe and having an outlet below the outlet of said gas exit pipe, a liquid exit pipe within but not in communication with said fluid entrance pipe, said liquid exit pipe having an inlet above the outlet of said fluid entrance pipe, and communicating with the inlet of said gas exit pipe, means to force fluid downwardly through said entrance pipe, and means to draw liquid upwardly through said liquid exit pipe.

13. In a well apparatus. a gas exit pipe having an inlet, a fluid entrance pipe within said gas exit pipe and having an outlet below the outlet of said gas exit pipe, a liquid exit pipe within but not in communication with said fluid entrance pipe, said liquid exit pipe having an inlet above the outlet of said fluid entrance pipe, and communicating with the inlet of said gas exit pipe, means to force fluid downwardly through said entrance pipe, and means to control the flow of gas and liquid through said exit pipes.

In testimony whereof, we hereunto affix our signatures.

KIRKLAND KELLEY.
SAMUEL J. PERKINS.